(12) United States Patent
Henson et al.

(10) Patent No.: US 7,463,037 B2
(45) Date of Patent: *Dec. 9, 2008

(54) DEVICES, SYSTEMS, AND METHODS FOR ADAPTIVE RF SENSING IN ARC FAULT DETECTION

(75) Inventors: Jeremy Henson, Durham, NC (US); Carlos Restrepo, Atlanta, GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/923,020

(22) Filed: Oct. 24, 2007

(65) Prior Publication Data

US 2008/0091308 A1    Apr. 17, 2008

Related U.S. Application Data

(63) Continuation of application No. 11/460,372, filed on Jul. 27, 2006, now Pat. No. 7,368,918.

(51) Int. Cl.
*H01H 9/50*    (2006.01)
*H02H 3/00*    (2006.01)
*G01R 31/00*   (2006.01)

(52) U.S. Cl. ............... 324/536; 361/42; 702/59

(58) Field of Classification Search ........... 324/536, 324/532, 522, 512, 509, 539, 535, 541, 544, 324/424; 361/42, 44, 79, 93.1, 86, 87, 102, 361/93.6; 702/58, 59, 64, 185
See application file for complete search history.

(56) References Cited

U.S. PATENT DOCUMENTS

| | | | |
|---|---|---|---|
| 3,863,187 A * | 1/1975 | Mahieu et al. | 337/162 |
| 4,114,089 A | 9/1978 | Ahmed | |
| 5,224,006 A * | 6/1993 | MacKenzie et al. | 361/45 |
| 5,434,509 A | 7/1995 | Blades | |
| 5,729,145 A | 3/1998 | Blades | |
| 6,031,699 A | 2/2000 | Dollar | |
| 6,259,996 B1 | 7/2001 | Haun et al. | |
| 6,417,671 B1 | 7/2002 | Tiemann | |
| 6,459,273 B1 | 10/2002 | Dollar | |
| 7,110,864 B2 | 9/2006 | Restrepo et al. | |
| 2003/0030448 A1 | 2/2003 | Sapir | |
| 2004/0136124 A1 | 7/2004 | Engel | |
| 2005/0254187 A1 | 11/2005 | Chu | |
| 2005/0286185 A1 | 12/2005 | Henson et al. | |
| 2006/0085146 A1 | 4/2006 | Peterson et al. | |

FOREIGN PATENT DOCUMENTS

EP    1638181 A    3/2006

* cited by examiner

*Primary Examiner*—Vincent Q Nguyen
*Assistant Examiner*—Hoai-An D Nguyen

(57) ABSTRACT

A method for arc fault detection, includes automatically generating an output signal responsive to an input signal. The input signal is indicative of an arc fault. The output signal is configured to cause an electrical circuit to open. The output signal is generated responsive to a derived signal based upon a first threshold having a first amplitude.

4 Claims, 4 Drawing Sheets

3000

```
Determine if Arc Fault Detection     3100
Algorithm is Executing
          ↓
Determine Start Time                  3200
          ↓
Record Sampled Values                 3300
          ↓
Determine Sample Percentage           3400
Within a Range
          ↓
Determine Sample Average              3500
          ↓
Determine Threshold Amplitudes        3600
          ↓
Update Thresholds                     3700
          ↓
Execute Arc Fault Determination       3800
Algorithm
          ↓
Trip Circuit Breaker                  3900
```

Fig. 3

DEVICES, SYSTEMS, AND METHODS FOR ADAPTIVE RF SENSING IN ARC FAULT DETECTION

RELATED APPLICATIONS

This application is a continuation of, claims priority to, and incorporates herein by reference in its entirety, pending U.S. patent application Ser.No. 11/460,372 titled "Devices, Systems, and Methods for Adaptive RF Sensing in Arc Fault Detection", filed 27 Jul. 2006.

BACKGROUND

U.S. Pat. No. 5,729,145 (Blades), which is incorporated by reference herein in its entirety, allegedly recites that "arcing in an AC power system is detected by monitoring the power waveform for wideband high-frequency noise, and examining the detected noise for patterns of variation in its amplitude synchronized to the power waveform. A narrowband, swept-frequency detector and synchronous averaging may be employed to improve discrimination of arc noise from background interference. An arcing fault interrupter for controlling a single circuit, and a whole house monitor, for detecting arcing anywhere in a house, are described." See Abstract.

United States Patent Publication No. 20050254187 (Chu), which is incorporated by reference herein in its entirety, allegedly recites an "apparatus and method for event-based detection of arc faults in a circuit. At least one sensor is arranged to sense anomaly events in an electrical signal in the circuit. The anomaly events include distortions of the waveform of the electrical signal. A processor identifies the anomaly events, and generates an alarm signal when the anomaly events are indicative of an arc fault. The anomaly events may include current waveform distortions and/or voltage waveform distortions. Waveform distortions may be measured indirectly; an impedance may be placed in series with the circuit, so that distortions of the current produces distortions in the voltage drop across the impedance, in which case those voltage distortions may be anomaly events. Arc faults may be identified by examining intervals such as individual AC cycles for anomaly events, then determining whether at least n of a moving series of m intervals include at least p such anomaly events. An actuator may be used to oppose any arc faults that are detected, such as a circuit breaker to interrupt the circuit, so as to provide arc fault protection. Existing circuits may be retrofitted with the sensor and processor for arc fault detection, along with an actuator for arc fault protection." See Abstract.

U.S. Pat. No. 6,459,273 (Dollar), which is incorporated by reference herein in its entirety, allegedly recites a "sputtering arc fault detector (10) for a system having an electrical conductor (14) carrying current to a load. The sputtering arc fault detector includes a current monitor (64) coupled to the conductor for generating a variable signal responsive to behavior of the current in the conductor. A level detector (58) is coupled to the monitor and generates a first pulse when the variable signal exceeds a first level. A step detector (62) is coupled to the monitor and is responsive to rapid step increases of the variable signal. The step detector generates a second pulse when the variable signal exceeds a second level. An arc verifier (48), which is coupled to the level detector and the step detector, combines the first and second pulses, and generates a fault signal when the combined pulses exceed a third level." See Abstract.

SUMMARY

Certain exemplary embodiments comprise a method, which can comprise automatically generating an output signal responsive to an input signal. The input signal can be indicative of an arc fault. The output signal can be configured to cause an electrical circuit to open. The output signal can be generated responsive to a derived signal based upon a first threshold having a first amplitude.

BRIEF DESCRIPTION OF THE DRAWINGS

A wide variety of potential practical and useful embodiments will be more readily understood through the following detailed description of certain exemplary embodiments, with reference to the accompanying exemplary drawings in which:

FIG. 3 is a flow chart of an exemplary Arc Fault Detection method 3000.

DEFINITIONS

Figure 1:
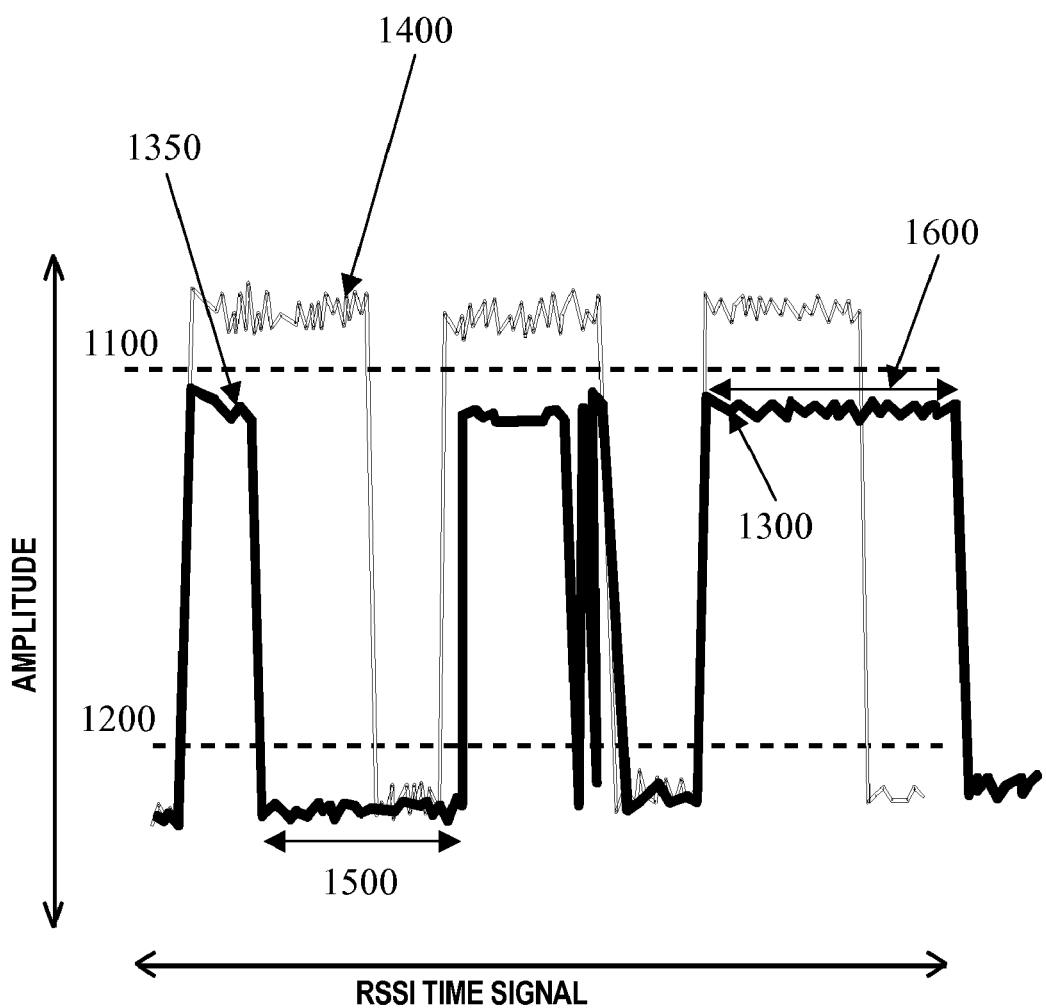
FIG. 1 is a plot of signal strength waveforms generated by both an exemplary arc fault condition and by an exemplary noise waveform.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof.
adapted to—made suitable or fit for a specific use or situation.
algorithm—machine instructions adapted to provide one or more predetermined results.
amplifier—a device that increases a magnitude of signals passing through it.
amplify—to increase a magnitude of a signal.
amplitude—magnitude.
analog—a signal formed from continuous measurement and/or input.
analog to digital converter—a device configured to receive an analog. input and generate a digital output related to the analog input.
analysis—a
and/or—either in conjunction with or in alternative to.
apparatus—an appliance or device for a particular purpose.
approximately—nearly the same as.
arc fault—a discharge of electricity between two or more conductors, the discharge associated with at least a predetermined voltage, current, and/or power level.
associate—to join, connect together, and/or relate.
associated with—related to.
automatically—acting or operating in a manner essentially independent of external influence or control. For example, an automatic light switch can turn on upon "seeing" a person in its view, without the person manually operating the light switch.

average—a value obtained by dividing a sum of a set of quantities by the count of quantities in the set.

below—less than in magnitude.

between—in a separating interval.

calibrate—to check, adjust, and/or determine by comparison with a standard.

can—is capable of, in at least some embodiments.

cause—to produce an effect.

change—to correct to a more desired value.

check—to inspect and/or test.

circuit—an electrically conducting pathway.

circuit breaker—a device adapted to automatically open an alternating current electrical circuit.

code—machine-readable instructions.

comprising—including but not limited to.

configure—to make suitable or fit for a specific use or situation.

configured to—capable of performing a particular function.

convert—to transform, adapt, and/or change.

correct—to change to a more desired value.

corruption—a state of being altered from a desired form.

count—(n.) a number reached by counting.

count—(v.) to increment, typically by one and beginning at zero.

create—to bring into being.

current—a flow of electrical energy.

data—distinct pieces of information, usually formatted in a special or predetermined way and/or organized to express concepts.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

dedicate—to commit and/or give entirely to a particular use, activity, cause, and/or entity.

define—to establish the outline, form, or structure of.

derive—to obtain from a source.

detect—to sense, perceive, and/or identify.

determine—to obtain, calculate, decide, deduce, and/or ascertain.

device—a machine, manufacture, and/or collection thereof.

differential current—a difference between a first flow of electrical charge involving a first electrical conductor and second flow of electrical charge involving a second electrical conductor.

digital—non-analog; discrete.

direct current (DC)—a non-alternating electric current.

duty cycle—a percentage of time that a pulse train is at a high logic state.

electrical—pertaining to electricity.

electrically coupled—connected in a manner adapted to transfer electrical energy.

energy—usable power.

estimate—to calculate and/or determine approximately and/or tentatively.

exceed—to be greater in magnitude than.

execute—to carry out one or more machine instructions.

fault—an arc fault or a ground fault.

fewer—less in number compared to a reference.

filter—(n.) one or more electrically coupled components configured to remove a portion of an electrical signal.

filter—(v.) to remove a portion of an electrical signal.

frequency—a number of times of an occurrence in a predetermined time period.

from—used to indicate a source.

gain—an increase or decrease in signal power, voltage, and/or current, expressed as the ratio of output to input.

generate—to create, produce, give rise to, and/or bring into existence.

greater—larger in magnitude.

ground fault—a shorting of an electrical device or circuit to ground.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

historical—from a prior time.

indicate—to signify.

indicative—serving to indicate.

indicator—a signal for attracting attention.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input—related to electricity entering a device.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

kilohertz—a count of thousands of cycles per second.

lower—lesser in magnitude in relation to something else.

low pass—configured to allow sub-signals of a signal characterized by a frequency below a predetermined maximum threshold to not be filtered, but to filter sub-signals characterized by frequencies above the predetermined maximum threshold from the signal.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

magnitude—a size or extent.

manage—to direct or control.

may—is allowed and/or permitted to, in at least some embodiments.

measure—to determine a value of something relative to a standard.

measurement—a dimension, quantification, and/or capacity, etc. determined by observation.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

microprocessor—an integrated circuit that comprises a central processing unit.

mix—to combine to produce a composite signal.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

obtain—to receive, calculate, determine, and/or compute.

occur—to take place.

operational—a state of being functional.

open—to create a gap across which an electrical current is substantially restricted from flowing.

oscillating carrier—a predetermined time-varying waveform.

output—something produced, and/or generated.

outside—not within.

parameter—one of a set of measurable factors, such as an electrical voltage value, current value, and/or frequency value.

percentage—a proportion or share in relation to a whole.

perform—to carry out.

pin—an electrically conductive appendage of a microprocessor.

plurality—the state of being plural and/or more than one.

power supply—a source of electrical energy.

potential—capable of being but not yet in existence.

predetermined—established in advance.

prevent—to keep an event from happening.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

produce—to manufacture or make.

project—to calculate, estimate, or predict.

provide—to furnish, supply, give, and/or make available.

range—a measure of an extent of a set of values.

receive—to take, get, acquire, and/or have bestowed upon.

recommend—to suggest, praise, commend, and/or endorse.

reference—an indicator that provides a value and/or orientation relative to something else.

relative—in comparison with.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—(n.) a message asking for something.

request—(v.) to express a desire for and/or ask for.

resistive current sensor—a device configured to measure an electrical flow via a voltage drop across a resistor.

resistor—a device used to control current in an electric circuit by impeding a flow of electrons.

responsive—reacting to an influence and/or impetus.

restart—begin again.

run status—an indication of operation or non-operation.

sample—to take a portion that is representative of a whole.

select—to make a choice or selection from alternatives.

sensor—a device or system adapted to detect or perceive automatically.

set—a related plurality.

signal—information, such as machine instructions for activities, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

simulate—to create as a representation or model of another thing.

single—one item.

store—to place, hold, and/or retain data, typically in a memory.

substantially—to a great extent or degree.

system—a collection of mechanisms, devices, data, and/or instructions, the collection designed to perform one or more specific functions.

temperature—measure of the average kinetic energy of the molecules in a sample of matter, expressed in terms of units or degrees designated on a standard scale.

terminate—to stop.

time period—an interval of a defined duration.

transmit—to send as a signal, provide, furnish, and/or supply.

trip—(n.) an opening of an electrical circuit that interrupts current flow in the electrical circuit.

trip—(v.) to open an electrical circuit; to automatically interrupt current flow in an electrical circuit.

upper—greater in magnitude in relation to something else.

user—any person, process, device, program, protocol, and/or system that uses a device.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to put to use.

value—an assigned or calculated numerical quantity.

variation measure—an extent to which something changes.

via—by way of and/or utilizing.

voltage—a difference in electrical potential between any two conductors of an electrical circuit.

waveform—a profile, graph, and/or visual model of variations of a signal's voltage and/or current over time.

weight—a value indicative of importance.

within—inside of.

DETAILED DESCRIPTION

Certain exemplary embodiments provide a method, which can comprise automatically generating an output signal responsive to an input signal. The input signal can be indicative of an arc fault. The output signal can be configured to cause an electrical circuit to open. The output signal can be generated responsive to a derived signal based upon a first threshold having a first amplitude.

Low amperage arcing in Alternating Current (AC) power systems can be distinguished from non-arcing conditions through the measurement of broadband Radio Frequency (RF) energy content generated by the fault. One or more Broadband over Power Line (BPL) signals and/or noise signals can be characterized by waveforms that can comprise similar characteristics to arc fault generated waveforms. Noise can be conducted within an AC power system and/or can be radiated.

Certain exemplary embodiments can distinguish between and arc fault and BPL and/or noise signals and/or waveforms. Certain exemplary embodiments can allow an arc fault detector, based on sensing RF energy, to operate in the presence of various broadband Radio Frequency (RF) noise sources of varying intensities and with frequency content that includes frequencies being utilized for arc fault detection. Additionally, multiple noise sources might be compensated for simultaneously.

Certain exemplary embodiments can be adapted to discriminate between arcing and non-arcing conditions when environmental broadband RF noise conditions are not assumed to be constant for all installation locations and/or at different times at a particular location. Certain exemplary embodiments can update certain threshold amplitudes used in the analysis of arc fault sensor data based on a history of the sensor data. An update of threshold amplitudes based on recent historical sensor data can provide relatively good performance of an arc fault detection system in the presence of environmental RF noise. Environmental noise can be assumed to be constant over short time durations.

In certain exemplary embodiments, an RF signal can be obtained from an AC branch through an RF sensor that could be an E-core shape ferrite sensor. The signal can be mixed with an oscillating carrier. Certain exemplary embodiments can comprise one or more algorithms adapted to determine a relevance of broadband RF signals. The signal, once mixed with the carrier, can be filtered and/or amplified. An energy level of the signal can be measured, quantified, and/or represented with a corresponding received signal strength indicator (RSSI). The RSSI signal can be a variable signal that can represent broadband conditions (e.g., arc fault conditions), other sources of broadband information broadcasting in an AC circuit branch, and/or broadband environmental noise, etc.

Certain exemplary embodiments can be implemented in one or more of hardware (such as in the form of a microprocessor and/or an Application Specific Integrated Circuit, etc.), firmware, and/or software. Certain exemplary embodiments can comprise a mixed-signal microprocessor with Analog-to-Digital conversion (A/D) capabilities. The microprocessor can be selected based on one or more characteristics of sensors and/or algorithms associated with arc fault detection.

An A/D input to the microprocessor can be driven by a variable signal that can represent broadband RF signal strength (energy) caused potentially by an arc fault and/or sources of RF noise. The microprocessor can execute both an adaptive sensor algorithm as well as an arc fault detection algorithm.

Certain exemplary embodiments can adjust threshold amplitudes used in analyzing sensor data to improve the performance of a system that might operate in differing RF noise environments. An arc fault detection algorithm that analyzes the sensor data in real time to determine if arcing is occurring can use these threshold amplitudes. The threshold amplitudes can be voltage values that can be used to determine certain characteristics of the input RSSI signal. The adjustments can be calculated based on historical sensor data collected over a relatively short time interval (e.g., a few seconds). Adjustments might be made when a relatively small level of variation is detected in historical sensor data. A relatively small level of variation can be an indication that no arcing conditions are occurring and that detected environmental broadband RF noise is relatively constant. When a relatively small level of variation is detected, certain exemplary embodiments can comprise an algorithm adapted to adjust threshold amplitudes to compensate for changes in one or more background noise characteristics.

In certain exemplary embodiments, the algorithm for adjusting one or more threshold amplitudes can operate in parallel with a companion arc fault detection algorithm. Certain exemplary embodiments can utilize sensor data from the A/D converter that can also be adapted for use by other algorithms, such as the arc fault detection algorithm. Certain exemplary embodiments might not process all incoming data in analyzing relatively long-term trends in historical data. In certain exemplary embodiments, the algorithm for adjusting one or more threshold amplitudes can be adapted to execute at a predetermined time interval. The predetermined time interval can be approximately, in milliseconds, 150, 135.6, 99, 84.9, 77.2, 40, 33.4, 25, 12, 8.2, 5, 2.2, 2, and any value or subrange therebetween. Certain exemplary embodiments can comprise a handshaking mechanism between algorithms to attempt to avoid changes to threshold amplitudes during analyses by other algorithms (e.g., the arc fault detection algorithm). Thus, certain exemplary embodiments might not update threshold amplitudes if one or more companion algorithms signal that an analysis for potential arcing conditions is in progress.

Certain exemplary embodiments can be adapted to wait for a predetermined time period after a handshaking signal from the companion algorithm indicates that the companion algorithm is idle and waiting for a next potential arcing condition. The predetermined time period can be approximately, in milliseconds, 1000, 800.1, 625, 499, 386.1, 300, 277, 188.1, 99, 50, 25, and/or any value or subrange therebetween.

After the predetermined time period, certain exemplary embodiments can begin collecting data to determine if a threshold amplitude update might be desired and, if so, what the new threshold amplitudes should be.

FIG. 1 is a plot of signal strength waveforms generated by both an exemplary arc fault condition and by an exemplary noise condition. An arc fault condition can result in a signal that can be characterized by an arc fault waveform 1400. A noise condition can result in a signal that can be characterized by a noise waveform 1300. Noise waveform 1300 can be characterized by one or more gap time intervals such as first gap time interval 1500 and second gap time interval 1600. First gap time interval 1500 can be of a distinct and measurably different duration that second gap interval 1600. Noise waveform 1300 can be characterized by an amplitude 1350.

A first threshold 1100 and/or a second threshold 1200 can be associated with an arc fault detection circuit configured to distinguish between noise waveform 1300 and arc fault waveform 1400. First threshold 1100 and second threshold 1200 can be configured to be changed responsive to a detected change in signal characteristics of the noise signal characterized by noise waveform 1300.

Figure 2:
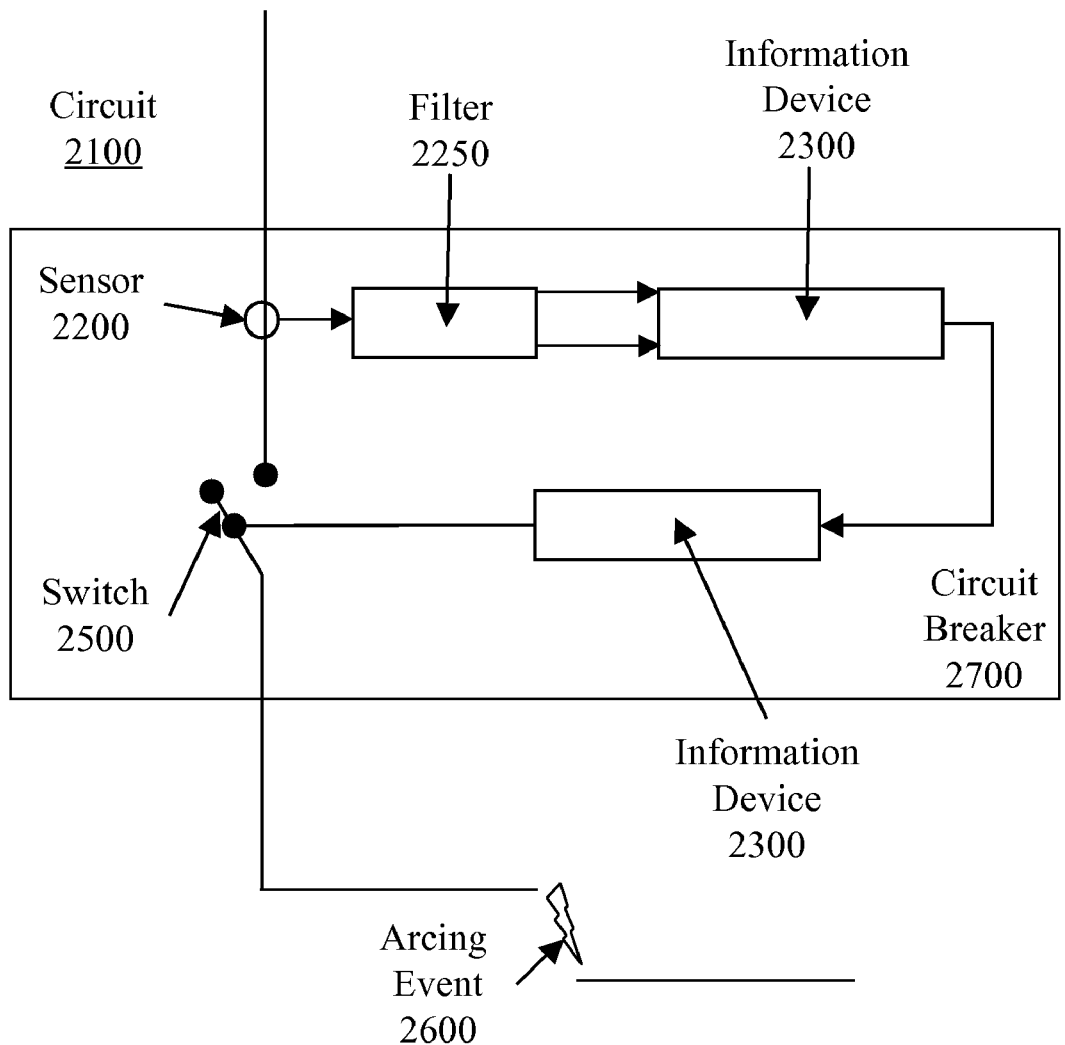
FIG. 2 is a block diagram of an exemplary embodiment of a system 2000.

FIG. 2 is a block diagram of an exemplary embodiment of a system 2000, which can comprise a circuit 2100, an alternating current through which can be sensed and/or detected by sensor 2200. A signal from sensor 2200 can be provided to filter 2250. Filter 2250 can be configured to derive an RSSI signal and a load current signal from the signal from sensor 2200. Filter 2250 can be configured to provide signals characterized by the RSSI waveform and/or the load current waveform to information device 2300 for processing. Prior to and/or at information device 2300, the signal can be processed and/or sampled. At information device 2300, the resulting data can be analyzed to identify, for example, to determine if a number of zero crossings of a waveform during a predetermined time period is above a first predetermined threshold, yet below a second predetermined threshold.

Based on a signal generated by information device 2300, such as in response to a determination and/or detection of an arcing event 2600 and/or an arcing condition, and/or detection of a hazardous arcing condition, an actuator 2400 can cause a switch 2500 to interrupt circuit 2100. Switch 2500 can be a circuit breaker, such as an Arc Fault Circuit Interrupter (AFCI). Switch 2500 can be a device configured to open circuit 2100 responsive to an output signal.

In certain exemplary embodiments, information device 2300 can comprise a processor, which can be configured to automatically generate an output signal responsive to an input signal. The input signal can be indicative of an arc fault. The output signal can be configured to cause circuit 2100 to open, such as via opening switch 2500. The output signal can be generated responsive to a derived signal based upon a first threshold having a first amplitude. The first threshold can be changed from the first amplitude to a second amplitude if a predetermined percentage of historical sampled values of a measured electrical parameter are within a predetermined range during a predetermined time period. The second amplitude for the first threshold can be based upon an average of a predetermined count of the historical sampled values of the measured electrical parameter.

In certain exemplary embodiments, sensor 2200, filter 2250, information device 2300, actuator 2400, and/or switch 2500 can be comprised by a circuit breaker 2700.

FIG. 3 is a flowchart of an exemplary embodiment of a method 3000. At activity 3100, a determination can be made whether an arc fault detection algorithm is executing. The arc fault algorithm can be any exemplary algorithm known to one skilled in the art. If the arc fault detection algorithm is executing, certain exemplary embodiments can avoid an update to one or more threshold amplitudes associated with the arc fault detection algorithm. In certain exemplary embodiments, activity 3100 can be repeated at predetermined and/or random times during activities of method 3000. In certain exemplary embodiments, a potential change of a threshold can be terminated responsive to a determination that the arc fault determination algorithm is operational.

At activity 3200, a start time can be determined. For example, the start time can be based upon an elapsed predetermined time interval since method 3000 has detected an idle status of the arc fault detection algorithm.

At activity 3300, sampled values can be obtained and/or recorded. The sampled values can be obtained from an obtained input signal. In certain exemplary embodiments, a predetermined number of sampled values can be obtained and/or stored. The count of sampled values can be any count, such as, 500, 399, 243, 122, 98, 76, 56, 41, 24, 12, 8, 4, 2, and/or any value or subrange therebetween. In certain exemplary embodiments, each of the sampled values can be obtained at a predetermined time interval. The predetermined time interval can be approximately, in milliseconds, 300, 243.7, 199, 176, 154.3, 100, 85.1, 44.3, 24, 12, 6, 4, 2, and/or any value or subrange therebetween.

At activity 3400, a determination can be made of a percentage of samples comprising values within a predetermined range. For example, all sampled values can be compared to a predetermined limit. When the sampled values are voltages, the predetermined limit can be approximately, in millivolts (mV), 500, 422.5, 350, 299.1, 187.6, 100, 77.3, 50, 33.2, 25, 20, 18.1, 12, 10, and/or any value or subrange therebetween. In certain exemplary embodiments, activity 3400 can be repeated after a predetermined amount of time has elapsed. The predetermined amount of time can be approximately, in seconds, 50, 33.1, 28.8, 16.4, 12, 9.9, 5.4, 4, 2, 0.9, 0.5, and/or any value or subrange therebetween.

In certain exemplary embodiments, if a predetermined percentage of samples are within a predetermined range, a decision can be made to update threshold amplitudes. If a predetermined percentage of samples is not within the predetermined range, a decision can be made to reset method 3000 and not update the threshold amplitudes. The predetermined percentage can be approximately, 98, 88.8, 75.3, 68.1, 60, 50, 45, 41, 133, 27.4, 20, and/or any value or subrange therebetween. Thus, in certain exemplary embodiments, a particular threshold amplitude might be changed only when a predetermined variation measure associated with the predetermined count of historical sampled values is below a predetermined threshold and/or magnitude.

At activity 3500, an average of a predetermined count of samples can be determined. The predetermined count of samples to be averaged can be approximately 100, 67, 50, 45, 31, 17, 12, 8, 4, 3, and/or any value or subrange therebetween.

At activity 3600, one or more updated threshold amplitudes can be determined. For example, a lower threshold amplitude can be determined by adding a first predetermined increment to the average of the predetermined samples. The first predetermined increment can be approximately, in millivolts, 500, 411, 345.6, 234.9, 166.6, 100, 98, 80.1, 65, 50, 24, 20, and/or any value or subrange therebetween. An upper threshold amplitude can be determined by adding a second predetermined increment to the average of the predetermined samples. The second predetermined increment can be approximately, in millivolts, 1000, 812, 677.6, 480.4, 333.3, 200, 181, 155.3, 112, 99.6, 56.0, 40, and/or any value or subrange therebetween.

At activity 3700, one or more threshold amplitudes can be updated. For example, the threshold amplitudes determined in activity 3600 can be stored in one or more predetermined locations for use as threshold amplitudes for the arc fault detection algorithm.

At activity 3800, the arc fault detection algorithm can execute based upon the updated threshold amplitudes. The arc fault detection algorithm can be adapted to obtain an input signal from one or more input signal sensors. The input signal can be mixed with an oscillating carrier. The mixed signal can be filtered. The filtered signal can be amplified. An energy magnitude of the amplified signal can be measured. The energy magnitude of the amplified signal can be compared against one or more threshold amplitudes to determine if additional arc fault tests should be performed. In certain exemplary embodiments, the arc fault detection algorithm can derive and/or obtain the RSSI signal. The RSSI signal can be analyzed to determine the presence of an arc fault.

At activity 3900, a circuit breaker can be tripped responsive to a determination of an arc fault by the arc fault detection algorithm. For example, an output signal can be automatically generated responsive to an input signal. The input signal can be indicative of an arc fault. The, output signal can be configured to cause an electrical circuit to open (e.g., the circuit breaker can be tripped). The output signal can be generated responsive to a derived signal (e.g., the RSSI signal) based upon a first threshold having a first amplitude. The first threshold can be changed from the first amplitude to a second amplitude if a predetermined percentage of historical sampled values of a measured electrical parameter are within a predetermined range during a predetermined time period. The second amplitude for the first threshold can be based upon an average of a predetermined count of the historical sampled values of the measured electrical parameter.

The output signal can be generated responsive to the derived signal, which can be based upon a second threshold having a third amplitude. The first threshold can be changed from the third amplitude to a fourth amplitude if a predetermined percentage of historical sampled values of a measured electrical parameter are within a predetermined range during a predetermined time period. The fourth amplitude for the second threshold can be based upon the average of the predetermined count of the historical sampled values of the measured electrical parameter.

Figure 4:
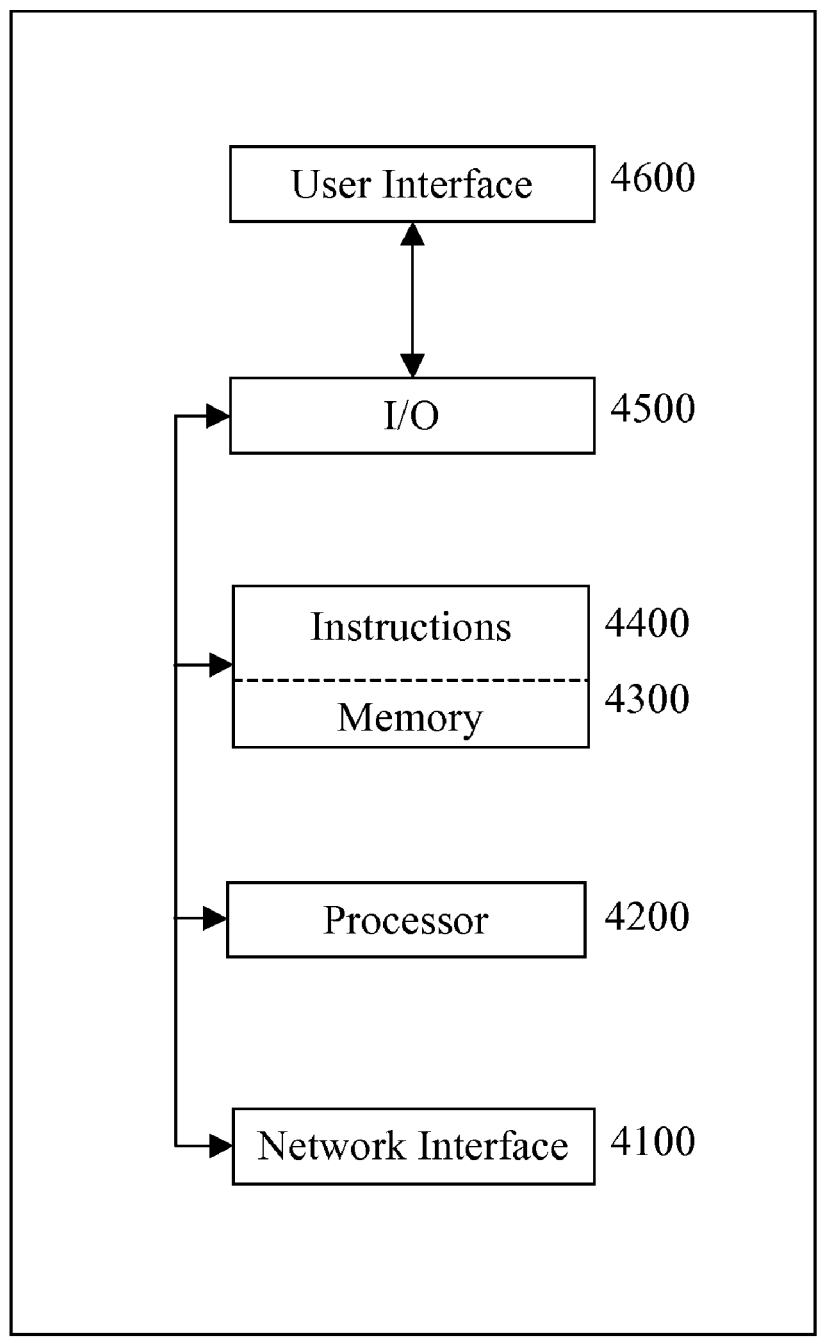
FIG. 4 is a block diagram of an exemplary embodiment of an information device 4000.

FIG. 4 is a block diagram of an exemplary embodiment of an information device 4000, which in certain operative embodiments can comprise, for example, information device 2300, of FIG. 2. Information device 4000 can comprise any of numerous components, such as for example, one or more network interfaces 4100, one or more processors 4200, one or more memories 4300 containing instructions 4400, one or more input/output (I/O) devices 4500, and/or one or more user interfaces 4600 coupled to I/O device 4500, etc.

In certain exemplary embodiments, via one or more user interfaces 4600, such as a graphical user interface, a user can view a rendering of information related to detecting an arc fault, changing one or more threshold amplitudes related to an arc fault detection system, and/or tripping a circuit breaker responsive to a detected arc fault, etc.

Note

Still other practical and useful embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application.

Thus, regardless of the content of any portion (e.g., title, field, background, summary, abstract, drawing figure, etc.) of this application, unless clearly specified to the contrary, such as via an explicit definition, assertion, or argument, with respect to any claim, whether of this application and/or any claim of any application claiming priority hereto, and whether originally presented or otherwise:

- there is no requirement for the inclusion of any particular described or illustrated characteristic, function, activity, or element, any particular sequence of activities, or any particular interrelationship of elements;
- any elements can be integrated, segregated, and/or duplicated;
- any activity can be repeated, performed by multiple entities, and/or performed in multiple jurisdictions; and
- any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

Accordingly, the descriptions and drawings are to be regarded as illustrative in nature, and not as restrictive.

What is claimed is:

1. A machine-readable medium encoded with machine instructions, the machine-readable medium defining steps comprising:

automatically generating an output signal responsive to an input signal, said input signal indicative of an arc fault, said output signal configured to cause an electrical circuit to open, said output signal generated responsive to a derived signal based upon a first threshold having a first amplitude, said first threshold changed from said first amplitude to a second amplitude if a predetermined percentage of historical sampled values of a measured electrical parameter are within a predetermined range during a predetermined time period, said second amplitude for said first threshold based upon an average of a predetermined count of said historical sampled values of said measured electrical parameter.

2. A system comprising:

a processor configured to:

automatically generating an output signal responsive to an input signal, said input signal indicative of an arc fault, said output signal configured to cause an electrical circuit to open, said output signal generated responsive to a derived signal based upon a first threshold having a first amplitude, said first threshold changed from said first amplitude to a second amplitude if a predetermined percentage of historical sampled values of a measured electrical parameter are within a predetermined range during a predetermined time period, said second amplitude for said first threshold based upon an average of a predetermined count of said historical sampled values of said measured electrical parameter.

3. The system of claim 2, further comprising:

a circuit breaker comprising said processor.

4. The system of claim 2, further comprising:

a device configured to open said electrical circuit responsive to said output signal.

* * * * *